United States Patent
Jerman et al.

(10) Patent No.: US 6,574,696 B1
(45) Date of Patent: Jun. 3, 2003

(54) METHODS AND ARRANGEMENTS FOR PROVIDING BI-DIRECTIONAL CONTROL BETWEEN DATA STORAGE DRIVES AND AUTOMATION CONTROLLERS

(75) Inventors: Steve Jerman, Boise, ID (US); Mark J. Simms, Bristol (GB); Robert J. Lang, Boise, ID (US); Ladawan Johnson, Eagle, ID (US); Paul F. Bartlett, Bristol (GB); Brad W. Culp, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/519,928

(22) Filed: Mar. 7, 2000

(51) Int. Cl.⁷ .............................................. G06F 13/14
(52) U.S. Cl. ........................... 710/305; 710/1; 710/40; 710/105; 709/211; 714/6
(58) Field of Search ................................ 710/305, 105, 710/40, 1; 345/419; 709/211; 714/6

(56) References Cited

U.S. PATENT DOCUMENTS

| | | | | |
|---|---|---|---|---|
| 4,993,030 A | * | 2/1991 | Krakauer et al. | 714/6 |
| 5,077,737 A | * | 12/1991 | Leger et al. | 714/6 |
| 5,454,085 A | * | 9/1995 | Gajjar et al. | 710/105 |
| 6,084,589 A | * | 7/2000 | Shima | 345/419 |
| 6,209,023 B1 | * | 3/2001 | Dimitroff et al. | 709/211 |
| 6,317,800 B1 | * | 11/2001 | Westby et al. | 710/40 |
| 6,397,267 B1 | * | 5/2002 | Chong, Jr. | 710/1 |

* cited by examiner

Primary Examiner—Rupal Dharia
Assistant Examiner—Benjamin Ortiz

(57) ABSTRACT

An arrangement includes at least one data storage device, an automation controller, and an enhanced interface. The data storage device is connected to a computer and arranged to perform a plurality of operations in response to one or more commands received from the computer. The automation controller is configured to physically provide the data storage device with at least one data storage media. The enhanced interface operatively couples the data storage device with the automation controller, such that the data storage device can be selectively controlled by the automation controller and the automation controller can be selectively controlled by the data storage device depending on the received commands. The enhanced interface includes a standard serial interface and at least one additional line. The additional line is configured to provide a directing signal from the data storage device to the automation controller. This added capability allows for bidirectional control between the data storage device and the automation controller.

20 Claims, 3 Drawing Sheets

METHODS AND ARRANGEMENTS FOR PROVIDING BI-DIRECTIONAL CONTROL BETWEEN DATA STORAGE DRIVES AND AUTOMATION CONTROLLERS

TECHNICAL FIELD

The present invention relates to computers, and more particularly to data storage devices that include one or more automated loading subsystems that are designed to load/unload storage media into/from one or more data storage drives.

BACKGROUND

Providing users with large capacity data storage devices at a reasonably low cost has long been the goal of both disk drive and tape drive manufacturers. With the introduction of faster processors/data links, cheaper memory and more powerful software applications, there is an even greater need for large capacity data storage devices.

Magnetic disk drives tend to provide a relatively large capacity data storage capability. Conventional magnetic disk drives, however, are not well suited for longer-term data back up. For more secure, longer-term data back up, magnetic tape drives, removable magnetic disk drives, and/or optical disc drives tend to be better choices. With these data storage drives, a storage media, such as, for example, a tape cartridge, a magnetic disk, or optical disc, can be selectively accessed and later removed and perhaps stored in a safe location until and/or if needed.

Those users with the need to provide even more data storage capability, or perhaps ready access to data stored on storage media, can utilize one or more automated media loading devices (i.e., an automation controller) designed to automatically load/unload storage media into/from one or more data storage drives.

By way of example, FIG. 1 is a block diagram depicting a conventional data storage system 20 having a host computer 22, a storage drive 24 and an automation controller 26. Host computer 22 is configured to send/receive data to/from data storage drive 24, and to send/receive other commands to/from data storage drive 24 and/or automation controller 26. Data storage drive 24 can be a magnetic tape drive, a magnetic disk drive, an optical disc drive, or the like. Data storage drive 24 is configured to selectively access at least one storage medium during a read or write operation.

Automation controller 26 is operatively configured to selectively position a storage media, as required for access by data storage drive 24, in support of the read or write operation. To accomplish this, automation controller 26 typically includes mechanical mechanisms, such as, for example, robotics, that are configured to move the correct storage media into a proper position for reading from or writing to by data storage drive 24.

As can be appreciated, there is an inherent need to carefully control the operation of data storage drive 24 and automation controller 26 during a read or write operation. Typically, automation controller 26 is controlled by commands provided from host computer 22, and data storage drive 24 is controlled by commands from both host computer 22 and automation controller 26. In such a configuration, automation controller 26 is essentially a "master" device and data storage drive 24 is essentially a "slave" device.

Commands from host computer 22 to automation controller 26 and data to/from data storage drive 24 are carried by link 27. Link 27 is usually a small computer system interface (SCSI) link that also carries data during the read or write operation.

Commands from automation controller 26 to data storage drive 24 are typically carried over a standard serial interface 30, such as, for example, an RS-422, or other like serial interface. Serial interface 30 typically allows automation controller 26 to co-coordinate activities with data storage drive 24, for example, by obtaining information (e.g., status, etc.) from data storage driver 24. This unidirectional information flow is one result of the master/slave relationship.

The configuration in FIG. 1, however, requires that both data storage drive 24 and automation controller 26 have SCSI interfaces. This requirement tends to increase the cost to the user. In more recent configurations, link 27 includes a Fibre Channel link. This requires that both data storage drive 24 and automation controller 26 have Fibre Channel interfaces, or that a bridge 28 or like device be introduced to bridge between Fibre Channel and SCSI interfaces in data storage drive 24 and automation controller 26. Both of these solutions can be very expensive to the user. Alternatively, replacing existing data storage systems with newer models can also be extraordinarily expensive and time consuming.

Thus, there is a need to provide for lower cost methods and arrangements that allow users to continue to utilize existing data storage devices, while taking advantage of higher bandwidth links, such as, for example, Fibre Channel. Preferably, the improved methods and arrangements will extend existing interfaces without compromising backwards compatibility. Moreover, providing bi-directional control and bi-directional information flow would tend to improve the operation of the data storage device by providing for increased coordination and communication.

SUMMARY

The present invention provides improved methods and arrangements that allow users to continue to utilize existing data storage devices, while taking advantage of higher bandwidth links, such as, for example, Fibre Channel. The various improved methods and arrangements extend existing interfaces without compromising backwards compatibility, and allow for bidirectional control and/or bidirectional information flow.

Thus, for example, the above stated needs and others are met by a data storage device, in accordance with certain aspects of the present invention. The data storage device includes at least one data storage drive, an automation controller, and an enhanced interface.

The data storage drive can be operatively coupled to a computer or like device and arranged to perform a plurality of operations in response to one or more commands received from the computer. The automation controller is configured to physically provide the data storage drive with at least one data storage media. The enhanced interface operatively couples the data storage drive with the automation controller, such that the data storage drive can be selectively controlled by the automation controller and the automation controller can be selectively controlled by the data storage drive depending on the received commands. This arrangement also allows for bi-directional information flow.

In certain implementations, for example, the enhanced interface includes a serial interface and at least one additional line. Here, the additional line is configured to provide a directing signal from the data storage device to the automation controller. In other implementations, the serial interface is further configured to provide a directing signal from the data storage device to the automation controller. As a result of the enhanced interface, the data storage drive and automation controller are capable of being connected to the computer through a single host interface within the data storage drive. For example, the host interface can include a small computer system interface (SCSI) or a Fibre Channel interface to the computer. The data storage drive can include a magnetic tape drive, a magnetic disk, an optical disc drive, or the like.

In accordance with certain further aspects of the present invention, an enhanced interface is provided for use in a data storage device having at least one data storage drive configurable and an automation controller. The enhanced interface includes a first automation controller interface (ACI) portion configurable within a data storage drive, a second automation controller interface (ACI) portion configurable within an automation controller, and a serial interface connected between the first ACI and the second ACI. The serial interface is configurable to provide a directing signal from the data storage device to the automation controller such that the data storage drive can be selectively controlled by the automation controller and the automation controller can be selectively controlled by the data storage drive depending on commands received by the data storage drive from a computer. This arrangement provides bi-directional flow of information.

In accordance with still further aspects of the present invention, a method for use in a data storage device having at least one data storage drive and an automation controller is provided. The method includes the steps of receiving a command from a host computer operatively coupled to a host interface within the data storage drive, and determining if the command is for the automation controller. If the command is for the automation controller, then the method includes the step of causing the data storage drive to send a directing signal to the automation controller over an enhanced interface that operatively couples the data storage drive with the automation controller. The method also includes the step of causing the automation controller to respond to the data storage driver upon receipt of the directing signal, such that the automation controller is selectively controlled by the data storage drive depending on the received command.

BRIEF DESCRIPTION OF THE DRAWINGS

A more complete understanding of the various methods and arrangements of the present invention may be had by reference to the following detailed description when taken in conjunction with the accompanying drawings, in accordance with certain exemplary embodiments of the present invention wherein.

DETAILED DESCRIPTION

Figure 1:
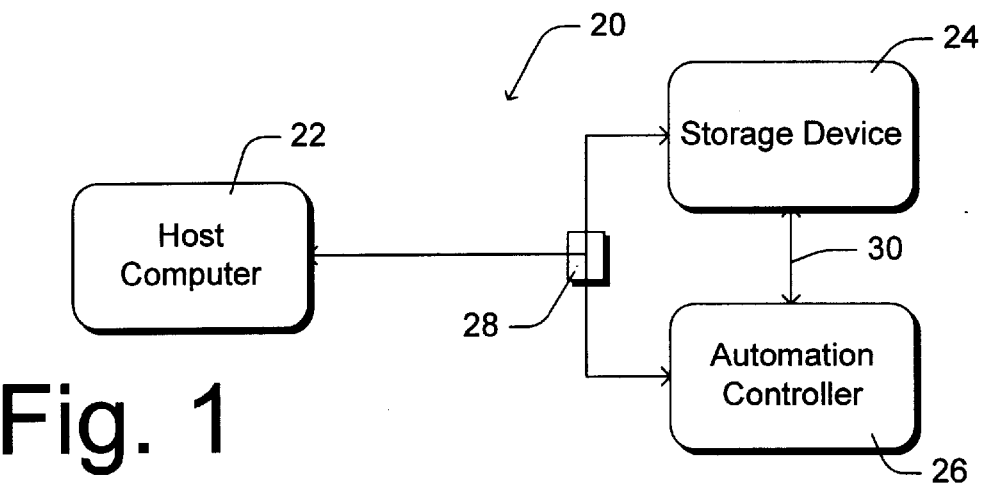
FIG. 1 is a block diagram depicting a conventional data storage system having a host computer coupled to control a data storage drive and an automation controller using separate link interfaces.
Figure 2:
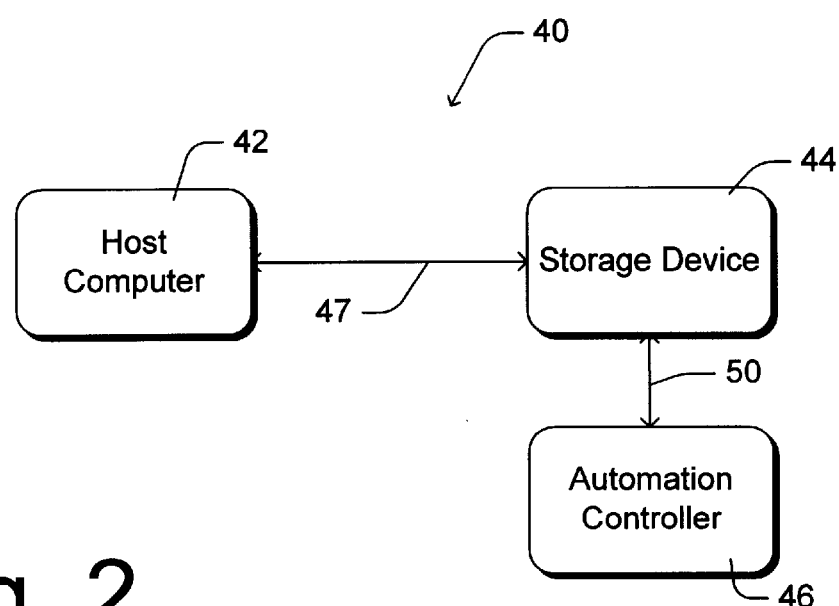
FIG. 2 is a block diagram depicting an improved data storage system having a host computer coupled to control a data storage drive and an automation controller using a single link interface and an enhanced interface between the data storage drive and the automation controller, in accordance with certain aspects of the present invention.

FIG. 2 is a block diagram depicting an improved data storage system 40 having a host computer 42, which is the same or similar to host computer 22 of FIG. 1. Host computer 42 is configured to access a data storage device having at least one data storage drive 44 and at least one automation controller 46. In accordance with certain aspects of the present invention, improved data storage system 40 requires only a single link interface 47 to control and/or otherwise interact with data storage drive 44 and automation controller 46. To accomplish this, data storage drive 44 and automation controller 46 are further operatively coupled together through an enhanced interface 50.

One of the benefits of this arrangement is that it reduces the need for additional expensive communication links and/or interfaces.

Another benefit is that bi-directional control and bi-directional information flow is supported between data storage drive 44 and automation controller 46.

Figure 3:
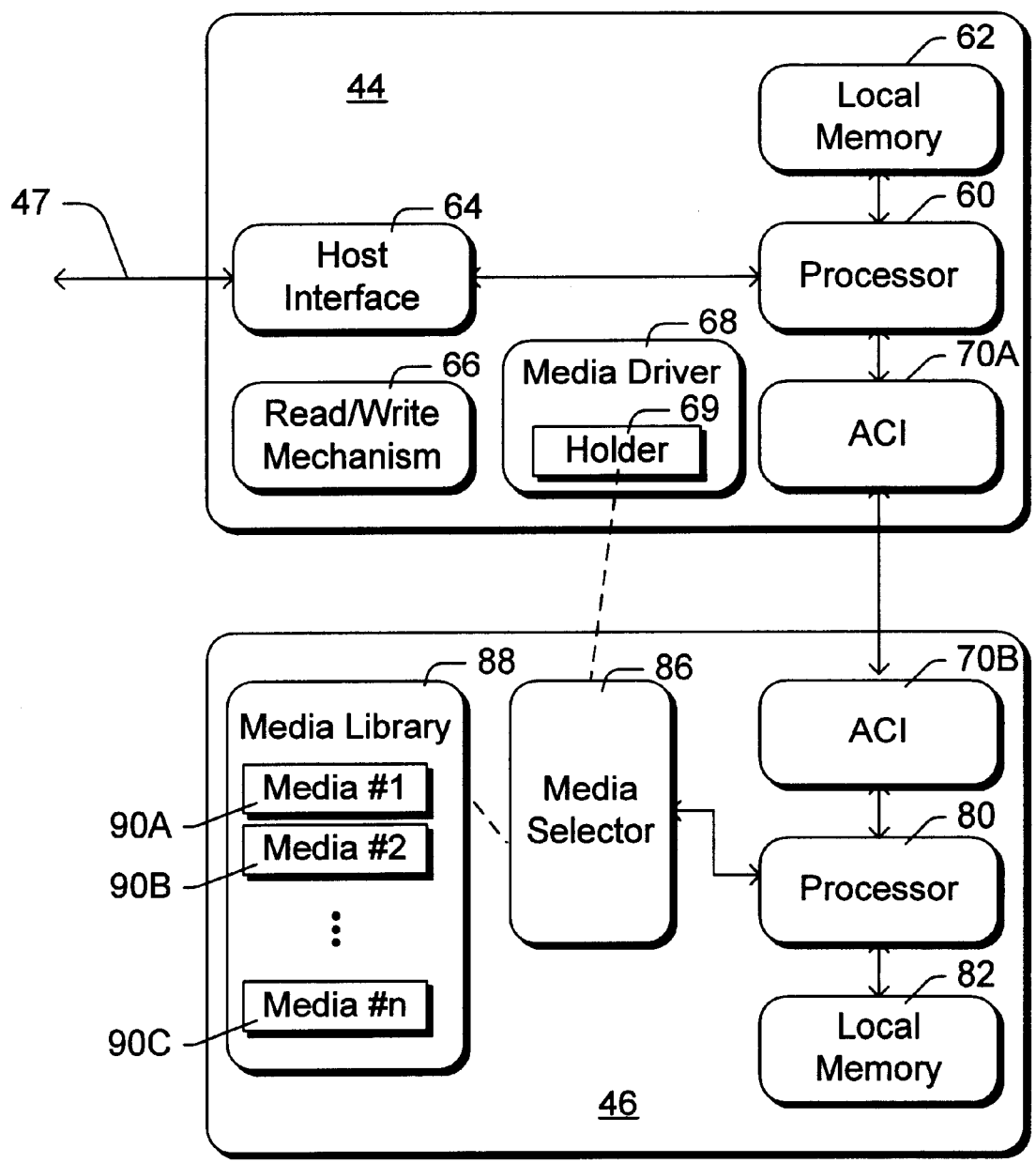
FIG. 3 is a more detailed block diagram depicting an exemplary implementation of the data storage drive and automation controller, as in FIG. 2, as coupled together through the enhanced interface.

Reference is now made to FIG. 3, wherein a more detailed block diagram depicts an exemplary implementation of certain portions of data storage drive 44 and automation controller 46.

As shown, data storage drive 44 includes at least one processor 60 that is configured to support read/write operations in response to commands received from host computer 42 and/or automation controller 46. To accomplish this task, processor 60 is operatively coupled to a local memory 62 that is configured to be accessed by processor 60, a host interface 64 that is configured to provide the necessary connectivity through link 47 to host computer 42, and an automation controller interface (ACI) 70A that is configured to provide bi-directional command and information flow capabilities between data storage drive 44 and automation controller 46.

Data storage drive 44 further includes a read/write mechanism 66 that is configured to selectively read data from a data storage media during a read operation, and selectively write data to the data storage media during a write operation. A media driver 68 is also provided within data storage drive 44 to physically support and manipulate the data storage media as required to support read/write operations. For example, media driver 68 may include tape drive loading and spooling mechanisms, magnetic disk/optical disc rotating mechanisms.

In this example, media driver 68 also includes a holder 69 that is configured to physically receive and present the storage media from/to mechanisms within automation controller 46. Read/write mechanism 66 and media driver 68 can be operatively controlled by processor 60, as required, to complete a read/write operation.

Automation controller 46 includes at least one processor 80 that is configured to support the selective placement of one or more data storage media with respect to data storage drive 44 in support of read/write operations as directed by host computer 42. To accomplish this task, processor 80 is operatively coupled to a local memory 82 that is configured to be accessed by processor 80, an ACI 70B that is configured to provide bi-directional command and information flow capabilities between automation controller 46 and data storage drive 44, and a media selector mechanism 86 that is configured to physically present/retrieve data storage media from holder 69 or the like within data storage drive 44.

As shown in this example, automation controller 46 further includes a media library 88 that is configured to hold a plurality of data storage media 90A–C. Media selector 86 is therefore able to select between data storage media 90A–C to support a read/write operation. For example, data storage media 90A–C may include bar code identifiers, or the like, that can be scanned by media selector 86 when searching for a particular data storage media.

In the past, automation controller 46 would control certain functions of data storage device 44 in response to associated commands received from host computer 42. Essentially, automation controller 46 acted as a "master" device that used serial interface 30 (see FIG. 1) to control data storage drive 44. This essentially made data storage drive 44 a "slave" device.

However, as shown in FIGS. 2–3, automation controller 46 no longer has a direct interface to host computer 42. Consequently, commands destined for automation controller 46 need to travel from host computer 42 through link 47 to data storage drive 44, and then from data storage drive 44 through enhanced ACI 50 to automation controller 46. To accomplish this, in light of the existing master/slave relationship, enhanced interface 50 and related ACIs 70A–B have been created to allow data storage drive 44 (i.e., the slave device) to interrupt or otherwise direct automation controller 46 (i.e., the master device) when commands are received over host interface 64. One result, for example, is that bi-directional control and information flow is provided to support the read/write and other support operations, as required.

Thus, for example, in accordance with certain implementations of the present invention, an additional escape or interrupt character(s) or other identifiable directing signal is provided by ACI 70A over enhanced interface 50 (e.g., thereby, enhancing a standard serial interface) to ACI 70B when a command for automation controller 46 has been received. This directing signal causes processor 80 to retrieve the command from data storage drive 44.

If link 47 is a SCSI link, for example, then data storage drive 44 is able to act as a surrogate for automation controller 46. Here, automation controller 46 may be defined as LUN1 and data storage drive 44 may be defined as LUN2, for example, with respect to host interface 64.

In accordance with still other implementations of the present invention, enhanced interface 50 includes a standard serial interface and at least one additional line that can be used by ACI 70A to direct ACI 70B that data storage drive 44 has a command for automation controller 46. One possible configuration is demonstrated in the block diagram of FIG. 4. Here, interface 50 includes serial interface 30 and at least one interrupt line 92 that is operatively coupled between ACI 70A and ACI 70B.

Figure 4:
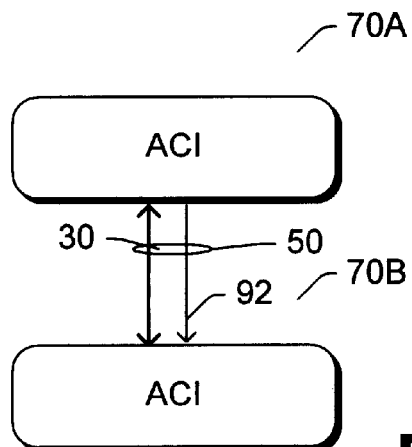
FIG. 4 is a block diagram depicting an exemplary implementation of the enhanced interface of FIG. 3, having a serial interface portion and at least one additional line.
Figure 5:
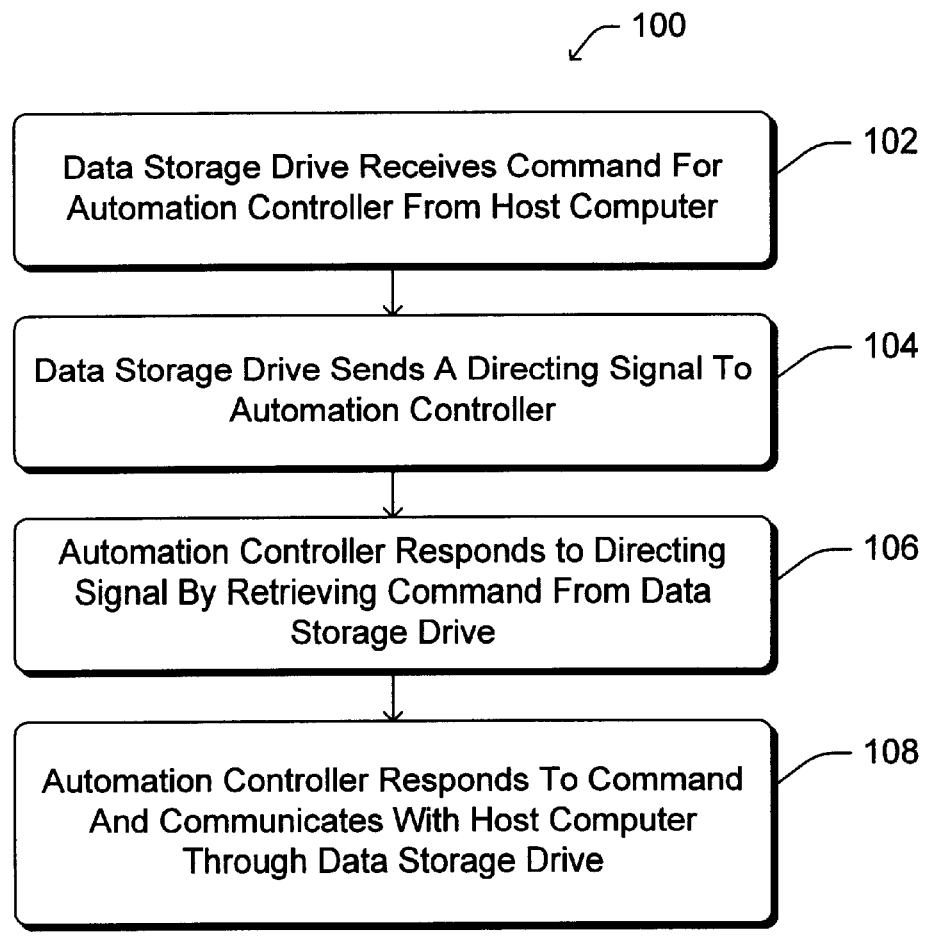
FIG. 5 is a flow chart of a process for providing bi-directional control and information flow between a data storage drive and an automation controller, as in FIG. 2.

FIG. 5 presents a flow chart of a process 100 for providing bi-directional control and information flow between data storage drive 44 and automation controller 46, for example, as shown in FIGS. 2–4.

In step 102, data storage drive 44 receives at least one command from host computer 42 that requires a response from automation controller 46. Next, in step 104, data storage drive 44 sends a directing signal to automation controller 46 that alerts automation controller 46 that data storage drive 44 has a command for it. The directing signal is provided over enhanced interface 50. In step 106, automation controller 46 responds to the interrupt generated in step 104 by retrieving the command from data storage drive 44 over interface 50. In step 108, automation controller 46 responds, as necessary, to the retrieved command, and subsequently communicates, as necessary, with host computer 42 through interface 50, data storage drive 44 and link 47.

Thus, for example, assume that host computer 42 sends a read element status command to data storage drive 44. Data storage drive 44 will receive the command as part of the "command" phase associated with the SCSI protocol. Data storage drive 44 will then send a directing signal to automation controller 46, for example, over additional line 92. Automation controller 46 will respond to data storage drive 44 with a get CDB command packet over serial interface 30. Data storage drive 44 will send an acknowledgement (ACK) to automation controller 46, followed by a CDB response packet (including the CDB).

Automation controller 46 will send an ACK upon receipt of the CDB response packet and send a data command packet (including data) to data storage drive 44. Data storage drive 44 will send an ACK upon receipt of the data command packet and will then send the received data to host computer 42 during a "data" phase associated with the SCSI protocol.

Next, data storage drive 44 sends a send data response packet to automation controller 46 over serial interface 30. In response, automation controller 46 sends an ACK and a status command packet (including sense data) to data storage drive 44. Data storage drive 44 sends an ACK upon receipt of the status command packet and sends the received sense data to host computer 42 during a "status" phase associated with the SCSI protocol. Next, data storage drive 44 sends a send status response packet to automation controller 46. Automation controller 46 will then send an ACK upon receipt, thereby ending the command sequence or session.

In this manner, there is no need for automation controller 46 to poll data storage drive 44 to check for commands, and there is no need for automation controller 46 to have a separate host interface, since one link (e.g., SCSI. Fibre Channel, etc.) can be shared by both data storage drive 44 and automation controller 46. Bi-directional control and information flow is advantageously provided. Furthermore, the enhancements can be implemented at reasonable expense to the user.

Thus, although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. An arrangement comprising:
   at least one data storage device configurable to be operatively coupled to one or more computers over a first link and arranged to perform a plurality of operations in response to one or more commands received there from;

an automation controller configured to physically provide the data storage device with at least one removable data storage media; and an enhanced interface configured to operatively couple the data storage device with the automation controller through at least a second link, such that the data storage device can be selectively controlled by the automation controller and the automation controller can be selectively controlled by the data storage device depending on the commands received over the first link by the data storage device, and wherein the automation controller is not coupled to the first link.

2. The arrangement as recited in claim 1, wherein the enhanced interface includes the second link having a serial interface and at least one additional line, each being connected between the data storage device and the automation controller, wherein the additional line is configured to provide a directing signal from the data storage device to the automation controller that identifies if the data storage device is in control of the automation controller or if the automation controller is in control of the data storage device.

3. The arrangement as recited in claim 1, wherein the enhanced interface includes the second link having a serial interface connected between the data storage device and the automation controller, and the serial interface is further configured to provide a directing signal from the data storage device to the automation controller that identifies if the data storage device is in control of the automation controller or if the automation controller is in control of the data storage device.

4. The arrangement as recited in claim 1, wherein the data storage device further includes a host interface that is configured to provide connectivity to the computer via the first link.

5. The arrangement as recited in claim 4, wherein the host interface is configured to provide a small computer system interface (SCSI) connectivity to the computer and the first link includes a SCSI link.

6. The arrangement as recited in claim 4, wherein the host interface is configured to provide a Fibre Channel connectivity to the computer via the first link which includes a Fibre Channel link.

7. The arrangement as recited in claim 1, wherein the data storage device includes a magnetic tape drive configured to receive at least one removable tape.

8. The arrangement as recited in claim 1, wherein the data storage device includes a magnetic disk drive configured to receive at least one removable disk.

9. The arrangement as recited in claim 1, wherein the data storage device includes an optical disc drive configured to receive at least one removable disc.

10. An arrangement comprising:

a first automation controller interface (ACI) portion configurable within a data storage device, wherein the data storage device can be operatively coupled to one or more computers over a first link and arranged to perform a plurality of operations in response to one or more commands received there from;

a second automation controller interface (ACI) portion configurable within an automation controller, wherein the automation controller is arranged to physically provide the data storage device with at least one removable data storage media; and a serial interface connected between the first ACI portion and the second ACI portion, the serial interface being configurable to provide a directing signal from the data storage device to the automation controller through at least a second link, such that the data storage device can be selectively controlled by the automation controller and the automation controller can be selectively controlled by the data storage device depending on the commands received over the first link by the data storage device, and wherein the second ACI is not coupled to the first link.

11. The arrangement as recited in claim 10, wherein the second link is further comprising:

at least one additional line connected between the first ACI portion and the second ACI portion, wherein the additional line is configurable to provide the directing signal from the data storage device to the automation controller that identifies if the data storage device is in control of the automation controller or if the automation controller is in control of the data storage device.

12. The arrangement as recited in claim 10, wherein the data storage device includes a magnetic tape drive configured to receive at least one removable tape, a magnetic disk drive configured to receive at least one removable disk, or an optical disc drive configured to receive at least one removable disc.

13. A method for use in an arrangement having at least one data storage device and an automation controller, the method comprising:

receiving a command from a host computer via a first link that is operatively coupled to a host interface within the data storage device;

determining if the command is for the automation controller;

if the command is for the automation controller, then causing the data storage device to send a directing signal to the automation controller over an enhanced interface that operatively couples the data storage device with the automation controller using at least a second link, and wherein the automation controller is not coupled to the first link; and causing the automation controller to respond to the data storage device upon receipt of the directing signal, such that the automation controller is selectively controlled by the data storage device depending on the received command.

14. The method as recited in claim 13, wherein the enhanced interface includes the second link having a serial interface and at least one additional line, each being connected between the data storage device and the automation controller, and wherein the additional line is configured to provide the directing signal from the data storage device to the automation controller that identifies if the data storage device is in control of the automation controller or if the automation controller is in control of the data storage device.

15. The method as recited in claim 13, wherein the enhanced interface includes the second link having a serial interface connected between the data storage device and the automation controller, and wherein the serial interface is further configured to provide the directing signal from the data storage device to the automation controller that identifies if the data storage device is in control of the automation controller or if the automation controller is in control of the data storage device.

16. The method as recited in claim 13, wherein the host interface is configured to provide a small computer system interface (SCSI) connectivity to the computer via the first link.

17. The method as recited in claim 13, wherein the host interface is configured to provide a Fibre Channel connectivity to the computer via the first link.

18. The method as recited in claim 13, wherein the data storage device includes a magnetic tape drive configured to receive at least one removable tape.

19. The method as recited in claim 13, wherein the data storage device includes a magnetic disk drive configured to receive at least one removable disk.

20. The method as recited in claim 13, wherein the data storage device includes an optical disc drive configured to receive at least one removable disc.

* * * * *